(12) United States Patent
McGill et al.

(10) Patent No.: US 7,146,670 B2
(45) Date of Patent: Dec. 12, 2006

(54) METHOD OF OPERATING A LAUNDRY APPLIANCE DRAIN PUMP

(75) Inventors: Ian Campbell McGill, Auckland (NZ); Lorraine Nevinson, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 0 days.

(21) Appl. No.: 10/692,046

(22) Filed: Oct. 23, 2003

(65) Prior Publication Data

US 2004/0078902 A1 Apr. 29, 2004

Related U.S. Application Data

(62) Division of application No. 09/856,412, filed as application No. PCT/NZ99/00193 on Nov. 17, 1999, now Pat. No. 6,748,618.

(30) Foreign Application Priority Data

Nov. 17, 1998 (NZ) ...................................... 332836

(51) Int. Cl.
*D06F 33/02* (2006.01)
(52) U.S. Cl. ......................................... 8/158; 68/12.14
(58) Field of Classification Search ............ 8/158–159; 68/12.14, 19, 208
See application file for complete search history.

(56) References Cited

U.S. PATENT DOCUMENTS

| | | | |
|---|---|---|---|
| 4,481,786 A * | 11/1984 | Bashark | ........................ 62/160 |
| 4,697,230 A | 9/1987 | Neft | |
| 4,700,148 A | 10/1987 | Pauly | |
| 4,813,248 A | 3/1989 | Smith et al. | |
| 4,857,814 A | 8/1989 | Duncan | |
| 5,247,231 A | 9/1993 | Glucina | |
| 5,436,825 A | 7/1995 | Wawra et al. | |
| 5,545,259 A * | 8/1996 | Suzuki et al. | .................. 134/18 |
| 5,604,387 A | 2/1997 | Cheyne | |
| 5,762,080 A * | 6/1998 | Edwards et al. | .......... 134/58 D |
| 5,856,736 A | 1/1999 | Rotunda et al. | |
| 5,917,690 A | 6/1999 | Anderson | |
| 6,035,235 A | 3/2000 | Perttu et al. | |
| 6,189,171 B1 | 2/2001 | Savkar et al. | |
| RE37,360 E | 9/2001 | Duncan | |
| 6,486,616 B1 | 11/2002 | Liu et al. | |

FOREIGN PATENT DOCUMENTS

| | | |
|---|---|---|
| FR | EP 0407272 | 6/1990 |
| JP | 61162980 | 7/1986 |
| JP | 576687 | 3/1993 |
| JP | 1085487 | 4/1998 |

OTHER PUBLICATIONS

English abstract of JP 61-162980.*

* cited by examiner

*Primary Examiner*—Joseph L. Perrin
(74) *Attorney, Agent, or Firm*—Trexler, Bushnell, Giangiorgi, Blackstone & Marr, Ltd.

(57) ABSTRACT

A method of operating a drain pump in a laundry washing machine during the drain phase of the wash cycle to reduce pump blockages is disclosed. The method includes the steps of (a) starting the pump and running it for a first period of time to produce a discharge of a given flow rate, (b) stopping the pump and leaving the pump stopped for a second period of time, and repeating steps (a) and (b) for the duration of said drain phase, said second period of time being such that the flow rate reduces substantially to zero.

9 Claims, 5 Drawing Sheets

METHOD OF OPERATING A LAUNDRY APPLIANCE DRAIN PUMP

This application is a divisional application of Ser. No. 09/856,412, which was accorded a filing date under 35 U.S.C. 371 of Aug. 28, 2001, now U.S. Pat. No. 6,748,618 which was the National Stage of International Application No. PCT/NZ99/00193 which has an international filing date of Nov. 17, 1999 and which was published in English on May 25, 2000 under International Publication Number WO 00/29660.

TECHNICAL FIELD

This invention relates to laundry machines. In particular it relates to laundry machine drain pump control, power supplies, electronically commutated permanent magnet motor drives and motor braking during spin dry cycles.

BACKGROUND ART

Most laundry machine drain pumps use an AC induction motor or synchronous motor, operating off the mains frequency, which is typically 50 or 60 Hz. This fixed frequency, along with the mains voltage, determines the design of the pump, and hence the flow rate and maximum head height that can be obtained.

There are numerous disadvantages of a fixed mains-frequency pump motor. These are: (a) the starting torque is typically low, making the pump susceptible to being blocked, (b) separate pump designs are needed for countries having differing mains voltage and frequency, (c) the noise level during "ventilation" is high, particularly when running at a supply frequency of 60 Hz, (d) the torque varies with the mains voltage and (e) there is no feedback to indicate if the pump is faulty.

By the nature of the washing process debris, including strands of textile, is removed from the wash load and flushed into the sump of the washing machine. This debris is then pumped out along with the dirty wash water. Occasionally the pump impeller will catch or the debris, or will start accumulating textile strands and then stop pumping.

Problems of this nature have been solved in other industries such as sewage handling, by having powerful motors driving pumps, with large clearances and large flow passages. Home appliances, however, do not have the space available to utilise large flow passages. One small volume solution in use is the vortex impeller, where the impeller has a shroud around it that eliminates the jamming point between vane end and the 'cutwater'. Unfortunately this pump has the disadvantage that it can still become blocked by bundles of fibres that become twisted "ropes" in the centre of the vortex.

Traditionally a laundry washing machine is turned off by employing one of two methods. In the first power to the washer is isolated using an expensive mains rated switch which de-energises it and makes power consumption negligible. The switch must be capable of carrying and breaking the total current required at the required voltage. In the second method the machine is made to appear it has been switched off by removing all power on indications on its control panel. In reality the machine's power usage is the same when it appears to be switched off as when it is switched on. These methods have the respective disadvantages that either a high current and/or voltage rated switch is required or power is consumed unnecessarily when the laundry machine is not in use.

The use of permanent magnet rotor three winding stator motors with electronic commutation of the windings is known. A common way of driving an electronically commutated three phase motor is to configure it in an H-Bridge between two dc rails, as shown in FIG. 5. The six power transistors Q1 to Q6 energise the motor windings by switching in a particular pattern. It is possible to have a high level of control over the speed and torque of the motor if feedback on the position of the rotor is available to the drive circuit logic which controls the switching pattern. The transistors are switched on by applying a voltage, usually 15V, from gate to source. Because the source voltage varies from 0V to the DC rail voltage, some technique is required to get the signal from the driving logic, which is referenced to 0V, to the high side gate which is referenced to the phase output (A, B, and C).

Common techniques are to use pulse transformers, purpose-designed ICs such as the IR2111, or optocouplers. A typical prior art circuit which employs an optocoupler for driving the high side transistor is shown in FIG. 6. When transistor Q2 switches off, noise is generated which tends to pull the optocoupler off. A logic inverter q4 ensures that turn off to the optocoupler means turn off of Q1. Since Q1 should always be off during turn off of Q2, correct operation of the circuit is not compromised. The disadvantage of this conventional optocoupler drive design is that high quality and therefore high cost devices are required.

During laundry machine spin dry cycles the spin tub is rotated at relatively high speed. At the termination of the spin cycle it is desirable to brake the motor to minimise spin tub run down speed. Conventionally this has been achieved by connecting resistors across the motor windings. This technique has the disadvantage that relatively high power resistors are required and these add to the cost of the laundry machine.

DISCLOSURE OF THE INVENTION

It is therefore an object of the present invention to provide a laundry machine having drain pump control, a power supply, a motor drive, and a motor braking system which overcomes the respective disadvantages outlined above.

In a first aspect the invention consists in a method of operating a drain pump in a laundry washing machine during the drain phase of the wash cycle to reduce pump blockages characterised in that:

(a) the pump is started and run for a first period of time,
(b) the pump is stopped for a second period of time which is less than 10% of said first period of time, and
(c) steps (a) and (b) are repeated for the duration of said drain phase.

In a second aspect the invention consists in a method of braking a top loading laundry washing machine spin tub wherein said spin tub is driven by an electronically commutated DC motor, wherein the commutation devices are connected to a DC power supply and have free-wheeling diodes connected in parallel therewith, and wherein said washing machine includes other components having inductive windings, characterised in that:

commutation of power to the motor windings is terminated, the voltage of the DC power supply is monitored, and when the DC power supply voltage exceeds a predetermined value the inductive winding of an unused component in said machine is connected across said DC power supply until the DC power supply voltage reduces below said pre-determined value.

In a third aspect the invention consists in a method of powering on and off a laundry washing machine where power is consumed in the form of direct current using a switched mode power supply of the type described in Australian Patent 651408 characterised in that:

an active switching device connected between the base of the lower switch in the motor bridge drive used as part of said switched mode power supply and the lower voltage rail is switched on by a latching circuit to cause the DC power supplies in said machine to be disabled, the latching circuit comprises a capacitor charged from the high voltage rail for said laundry machine motor in parallel with a transistor biased from the switched mode power supply low voltage rail, and a push button normally off switch connected in parallel with said capacitor is used to discharge said capacitor to disable said latching circuit to thereby enable the laundry machine DC power supplies.

In a fourth aspect the invention consists in an optocoupler drive circuit for the high side of a totem pole power transistor pair in a bridge circuit for commutating a motor characterised in that the optocoupler does not use a logic inverter on the output side and the optocoupler transistor is controlled to limit the speed of turn off and thus the speed of turn on of the upper power transistor in the totem pole.

In a fifth aspect the invention consists in a laundry washing machine including a wash bowl drain pump characterised in that:

said pump is driven by a variable speed motor which in turn is driven by a variable frequency pulse width modulated inverter, and the pump motor frequency is decreased at low bowl water levels to reduce the effects of ventilation.

BEST MODES FOR CARRYING OUT THE INVENTION

Pump Stopping to Clear Lint and Thus Prevent Pump Blocks

Figure 1:
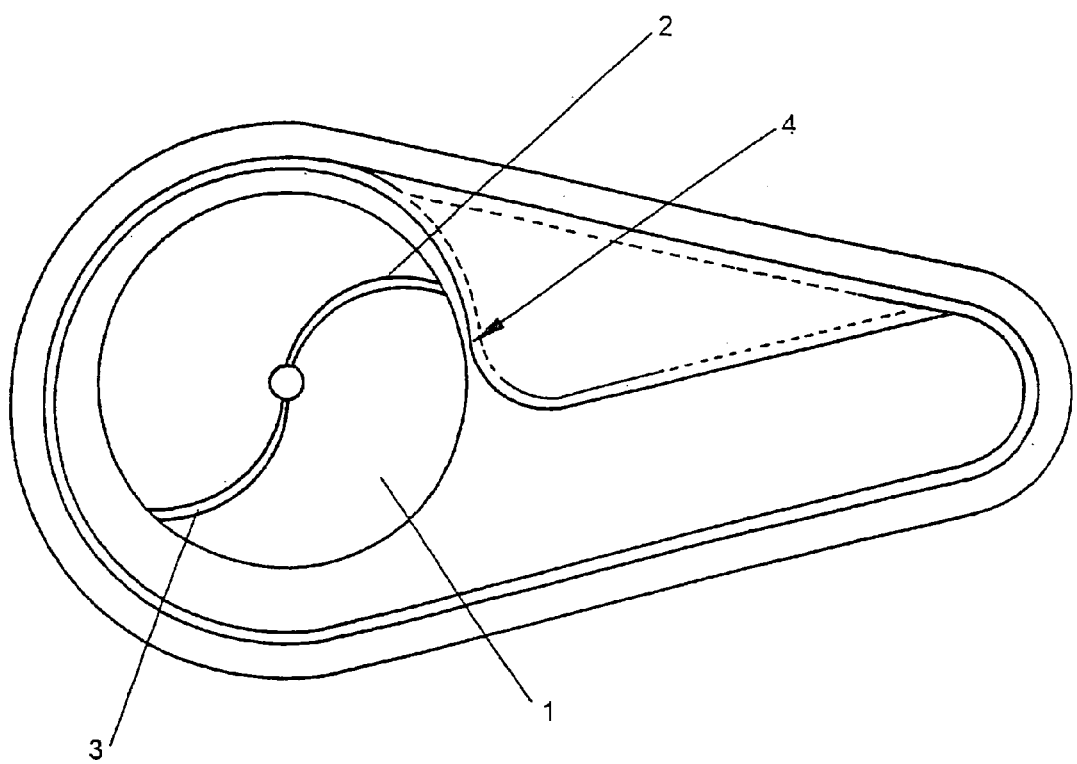
FIG. 1 shows a plan view of a laundry machine sludge pump.
Figure 2A:
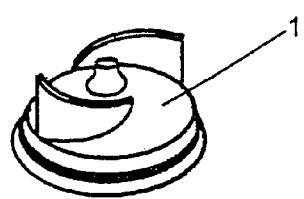
FIG. 2 shows alternative impellers for the sludge pump.
Figure 2B:
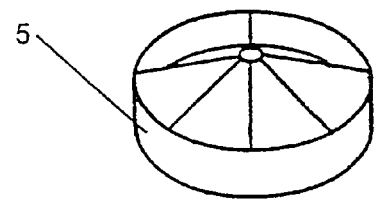

In a first embodiment of this invention there is provided a method of drain pump motor control that will flush through bundles of fibres before they become large enough to jam the pump. Typically the pump motor will be an ac induction motor which may be of the shaded pole type. FIG. 1 shows the plan view of a laundry machine sludge pump, with the impeller 1 having two, backwardly inclined vanes 2, 3, with large clearances, especially to the cutwater 4. FIG. 2a shows a perspective view of sludge impeller 1. An alternative vortex impeller 5 (FIG. 2b) may be used to reduce pump noise. It has vane recessed into the impeller.

The method of operation involves stopping the pump very quickly for a short period of time every few seconds. The sudden stop of the pump means that there is no more energy put into the vortex, and the momentum of the water flowing down the discharge pipe sucks the vortex and any fibres entrapped in the vortex out the pump exit. The pump is started again before the velocity in the discharge pipe reduces to zero so that the trapped fibres carry on out into the drain. If the pump off time is too long the discharge flow will stop and then reverses returning the fibres to the pump.

To achieve the sudden stop, a direct current is applied to the shaded pole (asynchronous) motor for 200 mS. This current produces a stationary flux that acts as a brake. It has been found experimentally that a stop for 200 mS every 10 seconds gives the best results.

Figure 3:
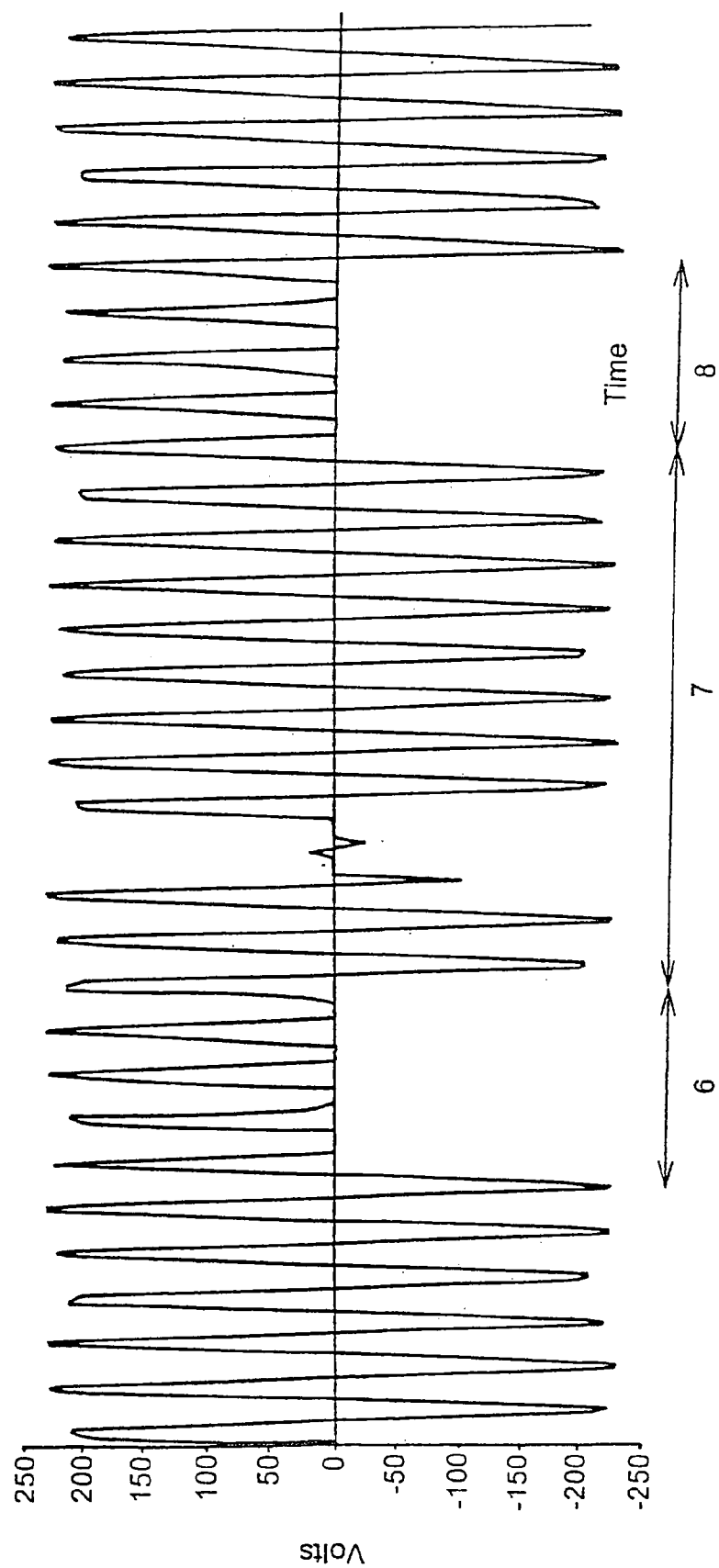
FIG. 3 shows a voltage waveform for a laundry machine sludge pump controlled in accordance with the present invention.

In one embodiment of this invention the shaded pole motor has half wave rectified voltage applied to produce the stationary flux. FIG. 3 shows the voltage history of this half wave rectified version, with interval 6 the first 200 mS stop interval, then a ten second (full wave) pumping period, 7 followed by a second 200 mS stop period 8.

Variable Speed Induction Motor Drain Pump

Figure 4:
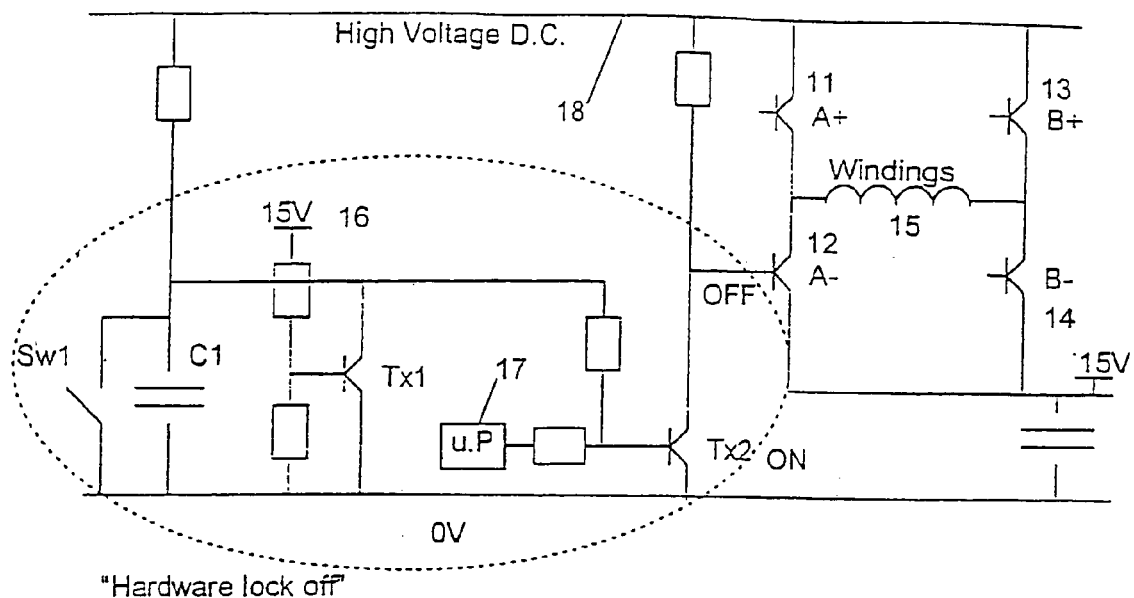
FIG. 4 shows a circuit for a laundry machine power supply derived from the laundry machine motor drive.

The laundry machine drain pump motor 15 of the present invention is driven from four switching devices 11 to 14 in an "H-bridge" configuration as shown in FIG. 4 to switch a 230V/50 Hz AC induction motor for the above described drain pump from a 325V DC rail (peak value of 230 volt RMS mains voltage), under the control of a microprocessor (not shown). The switching signals are pulse width modulated with a variable duty cycle. This allows the frequency and RMS voltage being applied to the pump to be controlled.

Variable Speed Pumping During Drain

When the water level in the laundry machine bowl is above a predetermined height—the "bowl float level" in a machine of the type described in New Zealand patent 215389/217623/218356—the pump speed is set to 60 Hz, to maximise the flow rate. This is achieved by programming the microprocessor which controls the switching frequency of the H bridge switching devices. When water level is below this predetermined height, "ventilation" will occur. The microprocessor is programmed to drive 50 Hz at such water levels. This reduction in speed reduces the noise level of the pump considerably, but still allows pumping over an acceptable head height.

The variable speed pumping described has three main advantages over fixed speed pumps:
(a) the drain time at 60 Hz is approximately 15% less than at 50 Hz, due to the higher flow rate to reduce a typical cycle time by about 1–2 minutes,
(b) audible noise is greatly reduced during "ventilation" by slowing the pump to 50 Hz, and (c) the same 230VAC/50 Hz pump design can be used irrespective of country in which the laundry machine is used.

Low Frequency, High Torque Pump Startup

To overcome the problem of the starting torque of AC induction motors being increases when the supply frequency is decreased in the present invention, when the pump starts, the drain pump microprocessor switches the H bridge devices 11 to 14 to produce a 30 Hz drive current to the pump motor but with an increased PWM duty cycle, for the first four revolutions (ie. 80 ms at 50 Hz). This provides a high torque "kick", which will attempt to dislodge anything which is impeding the pump impeller.

The microprocessor subsequently controls the H bridge devices to produce a drive current at the target frequency (50 or 60 Hz), but with a high PWM duty cycle, for the next 150 revolutions (3 seconds at 50 Hz). This helps to initially get the water over the required head height.

After these two "startup" phases, the microprocessor causes the PWM duty cycle to revert to the "normal" duty cycle for the desired drive frequency.

By programming the microprocessor to control the frequency and duty cycle during pump startup in this manner a reduction in pump blockage can be achieved.

Variable Pump PWM Depending on Mains Voltage

The nominal AC mains RMS voltage has a typical tolerance of 10%, which for nominal 230V AC, equates to a range of 207 to 253 volts. In rural areas, this variation can be even greater. This mains voltage variation has an effect on the current supply to the drain pump and thus the torque of the drain pump. The maximum head height and flow rate of the pump can therefore vary depending on the location of the laundry machine.

In this invention, the microprocessor is also caused to measure the DC rail voltage, and from this determine the mains voltage. The microprocessor is programmed to compensate for differing mains voltages by adjusting the duty cycle of the drive signal supplied to the pump motor. If the AC mains voltage is reduced, the duty cycle is increased, and vice versa, thereby ensuring a constant torque in the drain pump over a wide range of mains conditions.

When driving the pump at 60 Hz, the maximum torque available is less than when driving at 50 Hz. If the pump is operating at 60 Hz, and the mains voltage drops below a predetermined level (200V for nominal 230V), the flow rate will drop to an unacceptable level. In the present invention the microprocessor is programmed to reduce the frequency of the pump drive current to 50 Hz, and 60 Hz operation disabled until the microprocessor is reset.

By using variable duty cycle that is caused to vary as a function of mains voltage, a constant drain pump performance is maintained over a wider range of actual mains voltages than is normally possible. Secondly, by disabling the 60 Hz mode of operation when the mains drops below a predetermined voltage, the problem of very low flow rates is avoided when attempting to drain at 60 Hz under low mains conditions.

Pump Over-current Detection

Washing machine drain pumps are susceptible to water damage if they leak. This water damage eventually causes electrical shorting of the pump windings increasing the winding current and causing the pump it to overheat and fail, due to the change in winding resistance and inductance characteristics. As well as being a potential fire/smoke risk, this overheating and failure can also damage the hardware that is driving the pump, unless additional protection is provided.

Conventionally, there is no feedback indicative of current in the pump windings, so there is no "early warning" that the pump is being damaged in such circumstances. In the present invention the current peaks in the pump windings are monitored by the microprocessor. The current may typically peak at approximately 1.1A (rms=650 mA). If the microprocessor detects two consecutive current peaks of greater than 2.6A, it is programmed to flag a "pump overcurrent" fault to the pump motor controller microprocessor.

Since the change in electrical characteristics from water damage is gradual, this fault condition will occur and be detected before any other parts of the circuit are damaged, and before the pump becomes a potential fire/smoke hazard. It allows the replacement of a water-damaged pump before any other subsequent damage occurs.

Power Supply ON-OFF

In a third embodiment the invention provides a means of allowing a laundry machine power supply to power down automatically and power up via a low voltage, low current switch. This eliminates the need for a high current and/or voltage rated switch and ensures negligible power consumption when the laundry machine is not in use.

Referring to FIG. 4 power supply for the machine is produced by employing a simple switch mode power supply (SMPS) topology that is controlled by a microprocessor 17 and makes use of the main motor windings 15 and motor drive circuit 11 to 14. This general form of laundry machine power supply is described in the applicant's Australian Patent 651408. The power supply is disabled by a hardware circuit (fourth wire circuit). Power down functions are initiated by the micro processor and locked by the fourth wire circuit. Power up functions are initiated by the user via a low voltage, low current push button SW1.

Power Down

When the machine has finished a task and has received no further instructions for some defined time period, the microprocessor simply reduces the power output of the SMPS to zero hence powering down the machine. The fourth wire circuit is then enabled to ensure the SMPS does not power up until the user presses the appropriate push button on the control panel. This dramatically reduces the power consumption of the machine compared to that required by hardware lockout circuitry.

Power Up

The user presses a power button which disables the fourth wire circuit that is disabling the SMPS. The SMPS then starts up and brings alive the microprocessors. The machine is now ready for use.

In FIG. 4 a buck converter is inherent in the H-bridge topology of the motor drive. Assuming that A+ and B– devices 11 and 14 are off when the circuit is run as a buck converter, then the A– device 12 is latched on and B+ device 13 is driven by a PWM signal to control power output. The circuit can be modified by adding the "hardware lock off" circuitry to provide shutdown and start up functions.

Power Down

To shut down the SMPS the microprocessor simply turns off the A– device 12 by turning on transistor Tx2. The nominal 15 v rail 16 (produced by the SMPS) will drop in voltage and transistor Tx1 previously biased on by the 15 v, will turn off allowing capacitor C1 to charge from the high voltage DC rail 18. C1 then latches transistor Tx2 on hard so that the A– device 12 is latched off. Thus the buck converter is disabled.

Power Up

The user presses Sw1 which short circuits and discharges capacitor C1 thus turning off transistor Tx2 allowing the A– device 12 to turn on. The SMPS is then able to start up and produce the 15 v rail 16 required to latch transistor Tx1 on. The machine is now ready for use.

The employment of the described microprocessor controlled SMPS has the following advantages:

(a) a cheap low current, low voltage switch to be used to provide power up functions, (b) the power switch can be referenced to the SMPS zero volt rail allowing it to be used for other functions, (c) allowing the SMPS to shut down extends the life time of components and reduces any emissions from the product (i.e. RFI, EMI), (d) provides very low power consumption when not in use, and (e) eliminates transients caused by mains power interruption.

ECM Motor Drive

Figure 5:
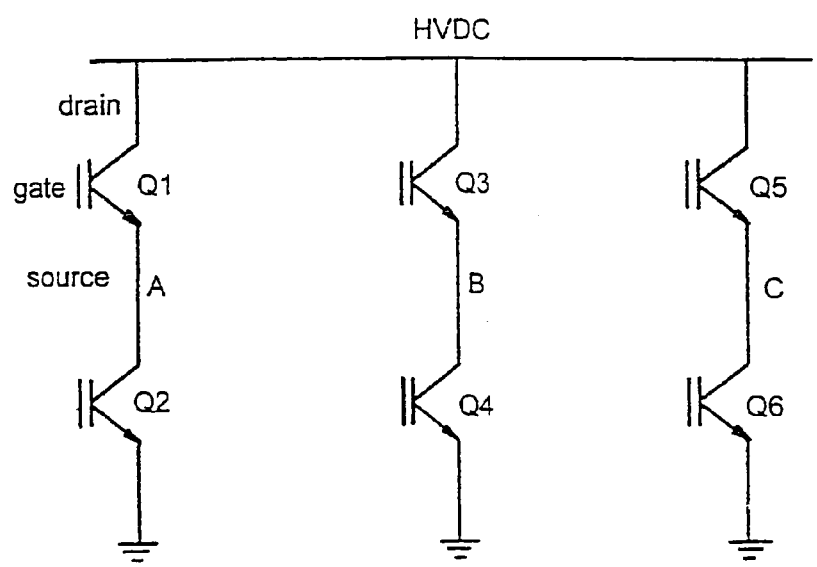
FIG. 5 shows a totem pole switching circuit for a three phase motor drive.

In a fourth embodiment the present invention provides a low cost high side drive for an H bridge switching circuit for an electronically commutated motor. Such a switching circuit is shown in FIG. 5 for commutating a three winding motor.

Figure 6:
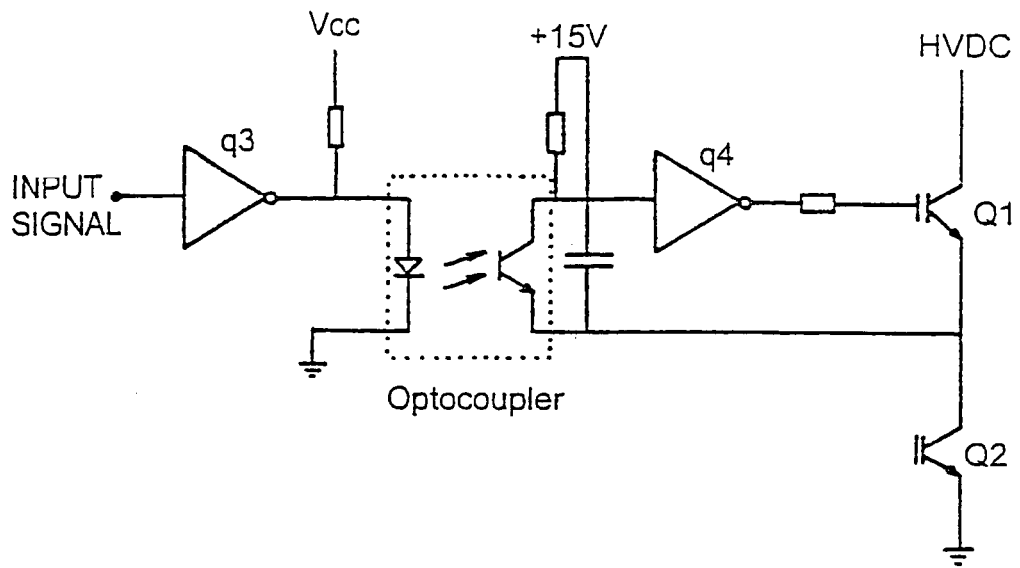
FIG. 6 shows a high side drive circuit using an optocoupler for the circuit of FIG. 5.
Figure 7:
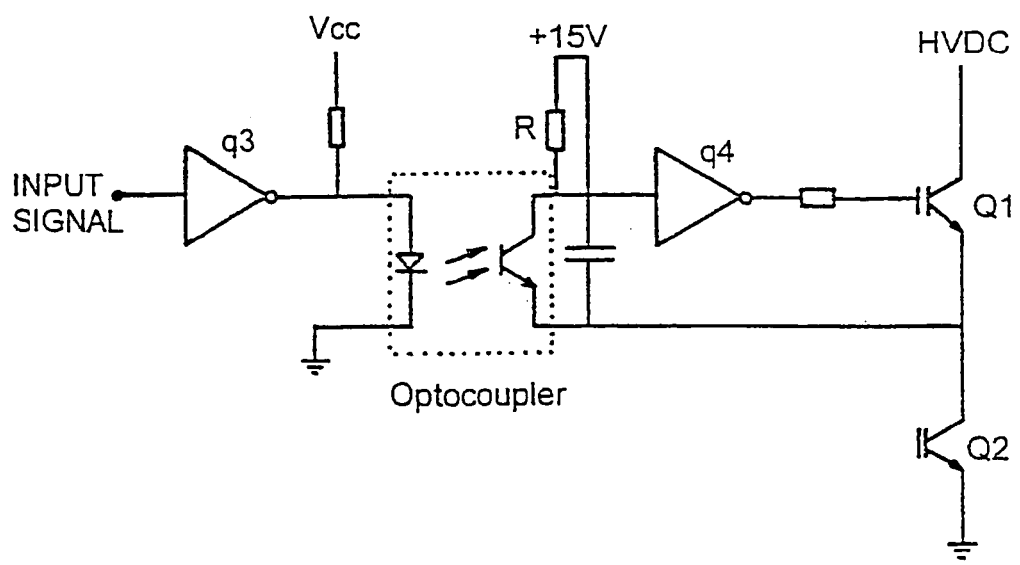
FIG. 7 shows a high side optocoupler drive circuit according to the present invention.

The present invention provides a more cost effective circuit to that shown in FIG. 6. This is shown in FIG. 7. Here, turn off of Q2 tends to turn on Q1. The value of resistor R is selected to limit the turn on speed of Q1 so there is no risk of overlap. Because this causes a slewed turn on for Q1, this circuit is only appropriate for switching Q1 at low frequency. Therefore the motor must be energised at audible switching frequencies.

The optocoupler can have relatively low gain and slew rate, which allows the use of a more cost effective device. There is also no need for an inverter such as q4 in FIG. 6.

Configuring at least one high side drive as in FIG. 7 is necessary to facilitate the power supply ON-OFF concept described in relation to FIG. 4.

Braking the Wash Tub Motor

In a fifth embodiment the invention provides a low cost method of braking a laundry machine motor.

One of the functions of a top loading vertical axis washing machine is to spin the wash tub at high rpm to remove excess water from the clothes at the end of the wash cycle. A spinning tub is unsafe for a user to touch so many machines have a brake function that quickly stops the spinning tub if the access lid is opened. This brake function can be done by different techniques and one technique that is becoming more common is to use regenerative braking from the main drive motor. Using this technique the drive motor effectively acts as a generator during brake and converts the energy from the spinning tub into electrical energy which is typically then converted into heat and dissipated via a dump resistor.

The present invention connects a motor or solenoid installed in the machine for some other purpose across the DC voltage rails for the motor so that the electrical energy generated during braking of the spinning tub can be dissipated in this motor/solenoid impedance saving the cost of additional components needed for a dump resistor or equivalent. The power dissipation component chosen must not be in operation for its primary purpose during braking of the spin tub.

Figure 8:
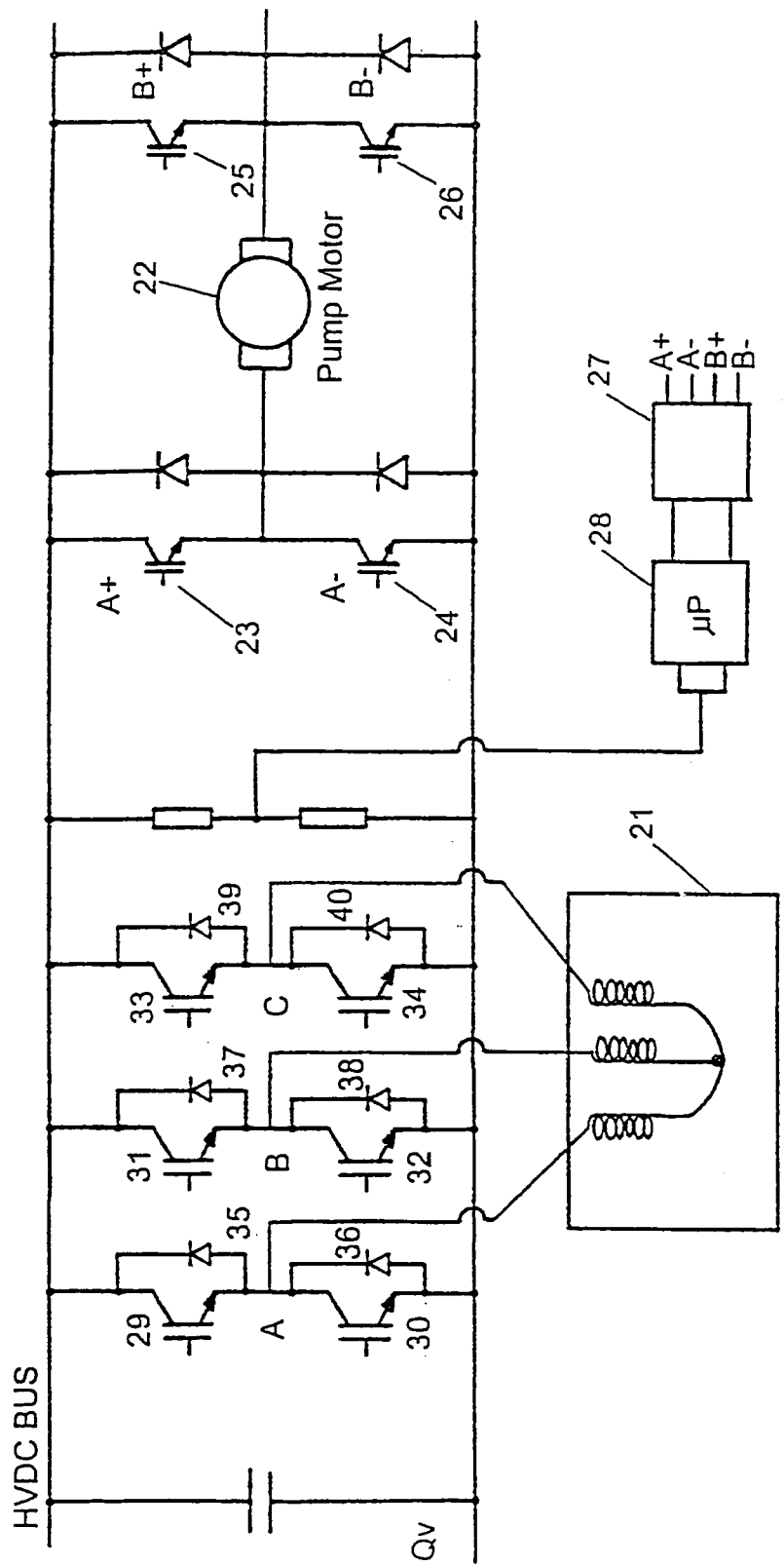
FIG. 8 shows a braking circuit for a laundry machine motor.

The circuit shown in FIG. 8 has a 3 phase brushless DC main motor 21 for driving a laundry machine agitator (not shown) and or spin tub and a water pump powered by an AC induction motor 22 both driven from the HVDC bus. The tree winding motor 21 is driven from the six transistor bridge 29 to 34. The pump motor 22 is driven from a four transistor H bridge 23 to 26 which in turn is switched by current steering circuitry 27 under the control of microprocessor 28. When main motor 21 is driven by the angular momentum of the spin tub as a generator, during a brake phase when switching devices 29 to 34 are off, electrical energy is fed back into the HVDC bus through free wheeling diodes 35 to 40 which results in an increase in the bus voltage. The bus voltage is sensed by microprocessor 28. When the bus voltage exceeds 400V DC, the microprocessor through current steering circuity 27 switches transistors 23 and 26 of the pump H bridge hard on until the bus voltage falls below 390V. In this way the regenerative braking energy is dissipated as heat in the pump motor windings. This heat is dissipated in the pump as power according to the equation:

$$P_{pump} = I^2_{pump} \times R_{pump} \qquad (1)$$

For a pump of this type the motor windings typically have a resistance of approximately 34 ohms. Therefor for a braking power of say 600W, from equation 1, the pump winding current is around 4.2 amps during braking.

The following advantages are achieved by this embodiment of the present invention: (a) a dump resistor and control circuit are eliminated, (b) by turning the pump on after a braking phase the braking energy (heat) can be quickly dissipated by the pump fan, (c) the heat rise due to the energy (heat) being dissipated in the pump windings is remote to the usually enclosed main motor electronics area where it can be difficult to ventilate and hence cool, and (d) the motor winding inductance reduces the peak currents that would flow in a purely resistive load, and hence the switching transistors.

It should be appreciated that other existing laundry machine resistive/inductive components could be utilised in place of the drain pump motor as a means of dissipating power. For example the solenoid in a solenoid controlled valve or other actuator could be used.

The invention claimed is:

1. A method of operating a drain pump in a laundry washing machine during a single drain phase of the wash cycle to reduce pump blockages comprising the steps of:
   (a) starting the pump and running it for a first period of time to produce a discharge of a given flow rate,
   (b) stopping rotation of the pump for a second non-zero period of time which is less than 10% of said first period of time by braking the pump, said second period of time being such that the flow rate reduces substantially to zero, and
   (c) repeating steps (a) and (b) for the duration of said drain phase.

2. A method according to claim 1, wherein said second period of time is between 10% and 1% of said first period of time.

3. A method according to claim 2, wherein the first period of time is approximately 10 seconds and the second period of time is approximately 200 milliseconds.

4. A method according to claim 3, wherein said pump is driven by an AC induction motor, during said first period of time said motor is supplied with full wave alternating current and during said second period of time is supplied with half wave alternating current.

5. A method according to claim 2, wherein said pump is driven by an AC induction motor, during said first period at time said motor is supplied with full wave alternating current and during said second period of time is supplied with half wave alternating current.

6. A method according to claim 1, wherein the first period of time is approximately 10 seconds and the second period of time is approximately 200 milliseconds.

7. A method according to claim 6, wherein said pump is driven by an AC induction motor, during said first period of time said motor is supplied with full wave alternating current and during said second period of time is supplied with half wave alternating current.

8. A method according to claim 1, wherein said pump is driven by an AC induction motor, during said first period of time said motor is supplied with fill wave alternating current and during said second period of time is supplied with half wave alternating current.

9. A method according to claim 1 wherein said pump is stopped rapidly after said first period of time.

* * * * *

UNITED STATES PATENT AND TRADEMARK OFFICE
CERTIFICATE OF CORRECTION

| | | |
|---|---|---|
| PATENT NO. | : 7,146,670 B2 | Page 1 of 1 |
| APPLICATION NO. | : 10/692046 | |
| DATED | : December 12, 2006 | |
| INVENTOR(S) | : Ian Campbell McGill and Lorraine Nevinson | |

It is certified that error appears in the above-identified patent and that said Letters Patent is hereby corrected as shown below:

Column 8, Line 61 "with fill wave" should be -- with full wave --

Signed and Sealed this

Twenty-seventh Day of March, 2007

JON W. DUDAS
*Director of the United States Patent and Trademark Office*